United States Patent [19]

Zahs et al.

[11] 4,295,667
[45] Oct. 20, 1981

[54] ROTARY PIPE SWITCH

[75] Inventors: Gernot Zahs; Hans-Jürgen Wahle, both of Dortmund, Fed. Rep. of Germany

[73] Assignee: Vacmetal Gesellschaft für Vakuum-Metallurgie mbH, Dortmund, Fed. Rep. of Germany

[21] Appl. No.: 62,933

[22] Filed: Aug. 2, 1979

[30] Foreign Application Priority Data

Aug. 29, 1978 [DE] Fed. Rep. of Germany ... 7825611[U]

[51] Int. Cl.³ ............................................. F16L 55/00
[52] U.S. Cl. ...................................... 285/18; 285/157; 285/226
[58] Field of Search ................. 285/18, 9 R, 226, 157, 285/299, 300, 301, 184, 229, 12

[56] References Cited

U.S. PATENT DOCUMENTS

| | | | |
|---|---|---|---|
| 2,526,825 | 10/1950 | Nier et al. | 285/226 X |
| 2,547,106 | 4/1951 | Zachariassen | 285/9 R |
| 3,154,326 | 10/1964 | Anding | 285/9 R |
| 3,298,680 | 1/1967 | Jablin | 285/9 R |
| 3,395,731 | 8/1968 | Kauffman | 285/9 R X |
| 3,490,792 | 1/1970 | Piegza | 285/299 X |
| 4,106,798 | 8/1978 | Haug | 285/226 |

FOREIGN PATENT DOCUMENTS

| | | |
|---|---|---|
| 1814588 | 6/1970 | Fed. Rep. of Germany . |
| 1583307 | 10/1971 | Fed. Rep. of Germany ..... 285/9 R |
| 1812367 | 8/1975 | Fed. Rep. of Germany . |

Primary Examiner—Thomas F. Callaghan
Attorney, Agent, or Firm—Toren, McGeady & Stanger

[57] ABSTRACT

A plurality of distributing pipes arranged in a circular pattern around a central pipe are selectively interconnected with the central pipe by a rotary pipe switch which includes a pipe elbow having a rotary joint at one end thereof connecting the elbow to the central pipe to enable rotary motion of the elbow relative to the central pipe and an axial compensator at the other end of the elbow with a connector attached to the axial compensator for effecting connection and disconnection of the other end of the elbow with each of the plurality of distributing pipes. A driving device is provided to effect compression and expansion of the axial compensator in order to effect selective connection and disconnection of the connector with the various distributing pipes.

8 Claims, 2 Drawing Figures

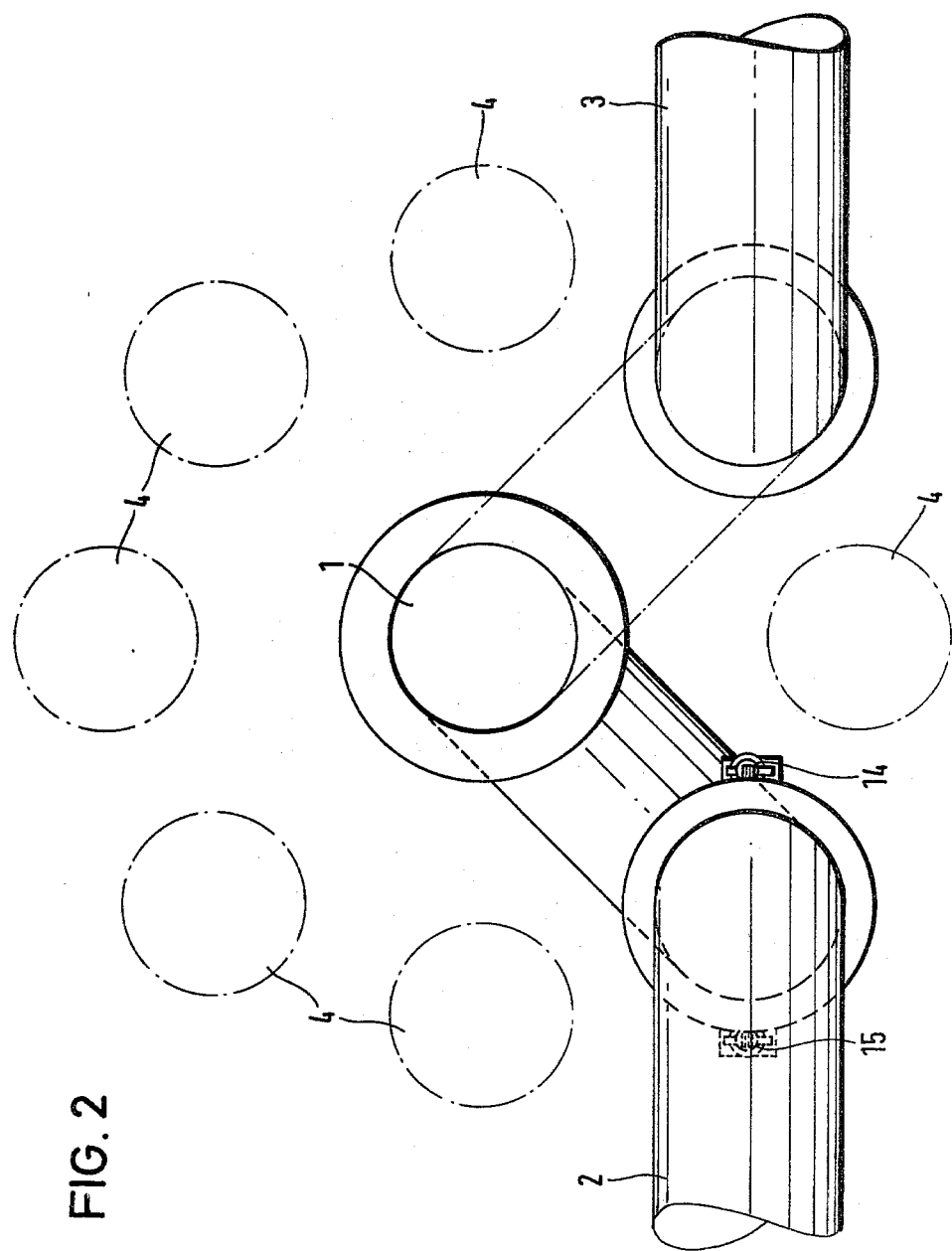

ROTARY PIPE SWITCH

BACKGROUND OF THE INVENTION

The present invention relates generally to flow control devices and more particularly to a rotary pipe switch which operates to selectively interconnect a central pipe with one of a plurality of distributing pipes arranged in a circular pattern around the central pipe.

Examples of prior art devices of the type to which the present invention relates may be found in German Auslegeschrift No. 18 14 588 which discloses a rotary pipe switch for pneumatic conveying plants. A switch of this type is formed with an S-shaped rotary pipe which is rotatably supported with its upper end in a main pipe and which has a lower end which can be connected to a plurality of branch pipes arranged in a circular pattern. The rotary pipe is constructed in two pieces and it has a hydraulic working cylinder which is joined with one end to the upper portion of the rotary pipe and with its other end to the lower portion of the rotary pipe. By means of the working cylinder, the lower portion of the rotary pipe can be pressed tightly onto the distributing pipe or it may be lifted therefrom.

Such known rotary pipe switches are suitable for pneumatic conveying plants utilizing dust-like or granular materials. The pipelines used in this type of application will have a relatively small inside cross sectional dimension and will be capable of easy manipulation.

Another type of prior art device known from German Auslegeschrift No. 18 12 367, involves a pipe switch wherein an incoming pipe may be selectively connected to a plurality of outgoing pipes through a flexible pipe and a rigid pipe. The rigid pipe is arranged at the end of the flexible pipe and arranged at the rigid pipe section is a thrust piston for swinging the flexible pipe. In the region of the rigid pipe section there are provided lifting elements which operate to effect slight movement in the axial direction of a connecting piece arranged at the lower end of the rigid pipe section.

Accordingly, the connecting piece can be lifted from an outgoing pipe, the thrust piston drive for effecting swinging movement can be subsequently actuated and the connecting piece can be finally brought into firm contact with another outgoing pipe by means of the lifting cylinders.

In technological areas of activity relating to partial vacuums and excess pressures, it is frequently necessary to connect a particular one of a plurality of user systems to a central generator for a partial vacuum or an excess pressure, while other user systems are not required. Generator and user systems of this type are provided with a stationary pipe system which is equipped with valves. However, unlike pipe switches, valves tend to be very sensitive when exposed to dirt or contamination. Thus, in the case of valve control devices utilizing several valves, failure of only one contaminated valve may cause malfunction of an entire control system.

In applications where large pipe dimensions are involved, pipe systems with several individual lines may be arranged in a relatively complicated pattern thereby requiring a substantial amount of space. Such systems are found, for example, in vacuum lines for the degasification of steel, in large gas lines utilized in the steel industry or in large ventilating and air removal systems where diameters of 1,000 mm or more may be involved. Moreover, cumbersome control and regulating mechanisms will be required for switching individual lines into a central line.

The present invention is directed toward providing a rotary pipe switch, particularly applicable where pipes with large dimensions may be involved, which is easy to operate, relatively simple in its design, does not require excessive space and avoids arrangements of pipe lines in complicated patterns.

SUMMARY OF THE INVENTION

In accordance with the present invention, an improved rotary pipe switch is provided wherein a pipe elbow is rotatably connected at one end to a central pipe by means of a rotary pipe joint with the other end of the elbow being provided with an axial compensator having connector means thereon for enabling connection with another pipe section. By means of two or more rotary pipe switches in accordance with the invention connected in parallel, one or more additional individual lines can be connected to the central line.

Adjusting devices supported by the pipe elbow may be arranged at the level, and on both sides of, the axial compensator. The adjusting devices may be thrust piston drives or they may also be electrical lifting devices. At the end of the pipe elbow several base members may be advantageously arranged and, at the level of a flange on the axial compensator several support members may be arranged on the pipe section, with the adjusting devices being arranged between these members. By actuating the adjusting devices, for example, by application of pressure from pneumatic thrust piston drives by means of compressed air, the flange on the axial compensator can be moved axially in a direction toward the axial compensator and away from an opposite flange of a distributing pipe thereby effecting compression of the axial compensator. The axial movement in the direction toward the axial compensator is necessary when the connection to one distributing pipe is to be separated in order to enable swinging of the elbow toward another distributing pipe. After the other distributing pipe is reached, a reverse working sequence is performed whereby the flange on the axial compensator is moved in the axial direction away from the axial compensator so that it will be pressed with its sealing member against an opposite flange of the distributing pipe to which connection is to be made.

It is found that a thrust piston drive or a gear motor are particularly suitable for swinging the pipe elbow. Moreover, in certain cases, it may be advisable to secure the flange between the pipe elbow and the distributing pipe by means of clamping members.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 2 is a top view of the rotary pipe switch system shown in FIG. 1.

DETAILED DESCRIPTION OF THE PREFERRED EMBODIMENT

Figure 1:
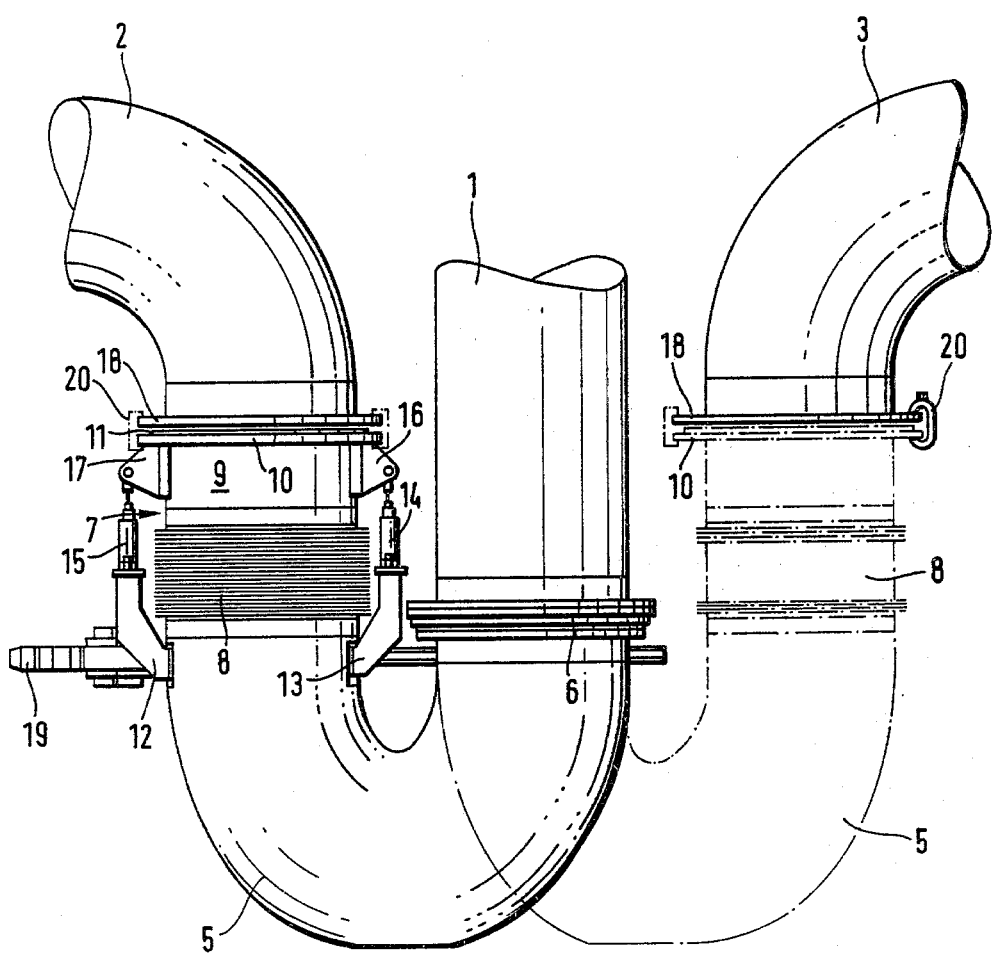
FIG. 1 is a side view of a rotary pipe switch system in accordance with the invention.

The system in accordance with the present invention as shown in FIGS. 1 and 2 comprises a rotary pipe switch which is operative for selectively interconnecting a central pipe 1 with a selected one of a plurality of distributing pipes 2, 3, 4 which are arranged in a circular pattern extending about the central pipe 1 as its center.

The central pipe 1 extends to a central station (not shown) which may be, for example, a generator for a partial vacuum or excess pressure. User devices (also not shown in the drawing) are connected to the distributing pipes 2, 3 and 4.

At the lower end of the central pipe 1 there is provided a pipe elbow 5 which is connected to the lower end of the central pipe 1 by means of a rotary joint 6. At the other end of the pipe elbow 5, the pipe elbow opens into a straight portion 7 having arranged at its lower region an axial compensator 8. Provided to extend above the axial compensator 8 there are a pipe section 9, a flange 10 and its sealing member 11.

Carried at an end of the pipe elbow 5 are base members 12, 13 upon which there are arranged adjusting or lifting devices 14, 15. With their other ends, the adjusting or lifting devices 14, 15 rest against support members 16, 17. Depending on the manner in which the adjusting devices 14, 15 are actuated, the axial compensator 8 will be either compressed or extended. As a result, it will be possible to press the flange 10 with its sealing member 11 against an oppositely located flange 18 of one of the distributing pipes such as the distributing pipe 2, or, conversely, to pull or remove the flange 10 from the flange 18 of a distributing pipe such as the pipe 2.

The pipe elbow 5 may be rotated or swung about the central pipe 1 by means of a drive 19 which may be constructed, for example, as a thrust piston drive, in an application wherein two or three distributing pipes are involved, or as a gear motor having a rim gear on the pipe elbow 5 in the case where several distributing pipes are involved.

The distributing pipes 3, 4 are arranged on the arc of a circle with the central pipe 1 located as the center of the circle. All the distributing pipes are arranged so that they may be reached by the flange 10 of the pipe elbow 5 by appropriate swinging or rotation of the pipe elbow 5 about the central pipe 1.

The flanges 18 of the distributing pipes 2, 3, 4 are fixed in a stationary position and they are equipped with automatic clamping devices 20 which insure that the flange connection between the connectors 10 and 18 will be tight in the case where operation involving excess pressures occurs.

While a specific embodiment of the invention has been shown and described in detail to illustrate the application of the inventive principles, it will be understood that the invention may be embodied otherwise without departing from such principles.

What is claimed is:

1. A rotary pipe switch for selectively interconnecting a central pipe to a selected one of a plurality of distributing pipes arranged in a circular pattern around said central pipe comprising a pipe elbow having a first end and a second end with a curved portion therebetween, rotary joint means at said first end for connecting said pipe elbow to a central pipe and for enabling rotary motion of said pipe elbow relative to said central pipe, axial compensator means located intermediate said curved portion and said second end of said pipe elbow, connector means attached at said second end of said pipe elbow for enabling connection and disconnection of said second end of said elbow to and from a distributing pipe, and at least two adjusting devices attached to said connector means, said adjusting devices and said axial compensator means being structured to enable axial movement of said connector means toward and away from each of a plurality of distributing pipes to enable said connector means to be attached with and detached from said distributing pipes, said rotary pipe switch also including means at said second end for driving said pipe elbow to enable selective attachment and detachment of said central pipe and said distributing pipes.

2. A rotary pipe switch according to claim 1 wherein said adjusting devices are supported on both sides of said axial compensator means on said second end of said pipe elbow.

3. A rotary pipe switch according to claim 2 wherein said adjusting devices are thrust piston drives.

4. A rotary pipe switch according to claim 1 wherein said adjusting devices consist of electrical lifting devices.

5. A rotary pipe switch according to claim 1 wherein said connector means comprise a flange member attached to said axial compensator means and wherein a plurality of base members are arranged at said second end of said pipe elbow and a plurality of support members are arranged at the level of said flange, said adjusting devices being arranged between said base members and said support members.

6. A rotary pipe switch according to claim 1 wherein said driving means comprise a thrust piston drive.

7. A rotary pipe switch according to claim 1 wherein said driving means comprise a gear motor.

8. A rotary pipe switch according to claim 1 wherein said connector means comprise a flange member located to be between said axial compensator means and a distributing pipe when said pipe elbow is connected with said distributing pipe, said rotary pipe switch further including clamping means for securing said flange member with a distributing pipe.

* * * * *